(12) United States Patent
Wolf (10) Patent No.: US 11,378,214 B2
(45) Date of Patent: Jul. 5, 2022

(54) COAXIAL TUBING SYSTEMS WITH SECURABLE SPACERS

(71) Applicant: Lawrence Wolf, Bohemia, NY (US)

(72) Inventor: Lawrence Wolf, Bohemia, NY (US)

( * ) Notice: Subject to any disclaimer, the term of this patent is extended or adjusted under 35 U.S.C. 154(b) by 209 days.

(21) Appl. No.: 16/913,013

(22) Filed: Jun. 26, 2020

(65) Prior Publication Data

US 2021/0404588 A1    Dec. 30, 2021

(51) Int. Cl.
*F16L 39/00* (2006.01)
*F16L 3/12* (2006.01)
*F16L 9/18* (2006.01)

(52) U.S. Cl.
CPC .......... *F16L 39/005* (2013.01); *F16L 3/1222* (2013.01); *F16L 9/18* (2013.01)

(58) Field of Classification Search
CPC .......... F16L 39/005; F16L 3/1222; F16L 9/18
USPC ......... 138/112–114, 148; 248/49, 74.1, 74.2; 285/133.1, 138
See application file for complete search history.

(56) References Cited

U.S. PATENT DOCUMENTS

| | | |
|---|---|---|
| 2,153,787 A | 4/1939 | Anderson |
| 2,440,245 A | 4/1948 | Georges |
| 2,821,092 A | 1/1958 | Cordora |
| 3,253,326 A | 5/1966 | Henry |
| 3,642,308 A | 2/1972 | Zeile, Jr. |
| 4,215,727 A | 8/1980 | Ter Wijlen |
| 4,240,850 A | 12/1980 | Arntz |
| 4,274,549 A * | 6/1981 | Germain .............. B60K 15/035 285/123.17 |
| 4,283,448 A | 8/1981 | Bowman |
| 4,691,741 A | 9/1987 | Affa |
| 4,756,339 A | 7/1988 | Buluschek |
| 5,018,260 A | 5/1991 | Ziu |
| 5,069,255 A | 12/1991 | Muszynski |
| 5,127,441 A | 7/1992 | Rains |
| 5,482,086 A * | 1/1996 | Hori ...................... F16L 3/1222 138/109 |
| 5,482,088 A * | 1/1996 | Ziu ....................... F16L 39/005 285/179 |
| 5,497,809 A | 3/1996 | Wolf |
| 5,799,395 A * | 9/1998 | Nording ................ F16L 51/00 29/890.036 |
| 6,464,261 B1 * | 10/2002 | Dybevik ................ E21B 43/08 138/155 |

(Continued)

FOREIGN PATENT DOCUMENTS

DE    2915838    10/1980

*Primary Examiner* — Patrick F Brinson
(74) *Attorney, Agent, or Firm* — FisherBroyles, LLP (57) ABSTRACT

Spacers are provided for maintaining annular tube spacing, particularly at tube ends, in coaxial tubing systems, while also proving fluid passages ways permitting fluid flow between tubes of the coaxial tubing system. The spacers may be made of conductive material for enabling electrical coupling of the inner and outer tubes, and thus grounding of the inner tube. The spacers define a retention groove extending around their periphery for receiving a crimped portion of the outer tube, so as to mechanically fix the spacer in a longitudinal position relative to the coaxial tubing system. Accordingly, the spacer does not rely on "springbuck" characteristics of bent coaxial tubing systems for fixation, and thus is suitable for use in both bend and unbent portions of coaxial tubing systems.

31 Claims, 7 Drawing Sheets

(56) References Cited

U.S. PATENT DOCUMENTS 10,520,116 B2 * 12/2019 Rappitsch .................. F16L 9/18
2017/0350540 A1 * 12/2017 Callaghan ................. F02C 7/00

* cited by examiner

FIG. 18

COAXIAL TUBING SYSTEMS WITH SECURABLE SPACERS

FIELD OF THE INVENTION

The present relates generally to coaxial tubing systems and, more particularly, to spacers for use in such systems that ensure a secure mechanical and/or electrical interconnection between coaxial tubing sections, both in bent and unbent regions of coaxial tubing.

DISCUSSION OF RELATED ART

In many applications in which tubes, pipes or conduits are arranged to enable a fluid to flow from one point to another, there is a concern about the occurrence of leaks at some joint or other unattended point. While such a leak in a water pipe may be of little concern, fuel leaks or leaks of some other fluid may result in a potentially dangerous situation or area contamination. In the latter class of applications, it may be desirable to provide some type of coaxial sleeve or shroud intended to contain any leaking fluid. However, known prior arrangements for this purpose have generally been subject to disadvantages such as large size, high cost, difficult in situ assembly, limited adaptability and low reliability.

For example, in passenger aircraft applications potential leaks in fuel lines linking fuel storage tanks to the engines represent a significant safety problem. In view of this, safety regulations require provision of some form of secondary barrier for leak containment, particularly at fuel line joints and fuel line runs in passenger and fire hazard areas of the aircraft. In the past, such secondary barriers have taken the form of metal or rubber shrouds significantly larger than the fuel line, which are assembled around the fuel line at the time of its installation in the aircraft.

Coaxial piping systems have been proposed in order to address some of the considerations discussed above. Rigid pipe systems can be provided using welds or connector assemblies at joints and corners, with some form of spacer inserted to preserve spacing between inner and outer pipe sections. Also, various forms of spacing protrudances can be provided on one or the other hose of a coaxial system utilizing two flexible rubber hoses. At the same time, even though a tubing system using coaxial metal tubes of bendable aluminum, for example, would provide significant advantages of light weight, reliability, long life and small size, so far as is known no practical such system has been available for applications of this type. A basic reason for such unavailability has been the very real problem of how to bend two metal tubes arranged coaxially, without the collapse or severe deformation of one tube or the other. It is also generally desirable to avoid having the inner tube forced against the outer tube during bending. Spacers can be inserted between the tubes, but have generally been unsatisfactory for maintaining structural integrity of the tube during the bending process. While equipment and methods have been available for maintaining structural integrity of a single tube while enabling it to be bent, such approaches have not been relevant to the problem of simultaneously maintaining structural integrity of the inner and outer tubes during the bending of two coaxial tubes.

U.S. Pat. No. 5,497,809 discloses vented bending sleeves for coaxial tubing systems that involve use of a bending sleeve inserted between inner and outer tubes that enables the inner and outer tubes to be bent simultaneously while maintaining structural integrity of both tubes. The bending sleeves are effective in transmitting bending forces to and from inner and outer tubes during bending, so as to limit tube collapse and deformation, and to maintain annular spacing between the tubes, and in providing longitudinal fluid passageways between the inner and outer tubes. Also disclosed is a spacer that is positioned between inner and outer tubes. The spacer may typically be installed before bending and acts to maintain desired annular spacing between inner and outer tubes, particularly at or toward ends of an outer tube section relative to an inner tube section. In certain embodiments, the spacer is made of a conductive material to electrically interconnect the inner and outer tubes, and thereby provide an inner tube electrical grounding capability (since the outer tube is typically grounded), which is important, for example, to prevent a spark therebetween, which could ignite fuel contained between the tubes, thus frustrating the safety-oriented purpose of coaxial tubing system.

Spacers having a split ring configuration are disclosed to be held in place by a constricting action around the inner tube after installation and/or by a lateral biasing force required to move and hold the inner tube to a centered position within the outer tube against the springback force present after bending has taken place. However, such lateral biasing is entirely absent for unbent coaxial tubing sections, as such lateral biasing is a direct result of the bending process and a difference between springback tendencies for the inner and outer tubes that acts to clamp the spacer therebetween. In some embodiments, the spacer may include stop tabs that extend radially outwardly to prevent the spacer from slipping to a position totally within the outer tube. However, in other embodiments, the stop tabs are omitted, and in either case, there is no structure that prevents the spacer from exiting the outer tube. Accordingly, there is no positive interlocking of the spacer to the coaxial tubing system to ensure a secure electrical interconnection between the tubes. While this may be suitable for coaxial tubing systems that do not require electrical interconnection/grounding and/or for coaxial tubing systems having bent regions that create lateral biasing sufficient to retain the spacer and/or it certain applications, the lack of a positive interlocking of the spacer is undesirable in certain other applications.

What is needed is a spacer and coaxial tubing system that provides for positive interlocking of the spacer, so that it is suitable for maintaining spacing and/or ensuring electrical interconnection/grounding in a broader range of applications and coaxial tubing system configurations.

SUMMARY

In accordance with one aspect of the present invention, a securable spacer for a coaxial tubing system is provided. The spacer is configured for maintaining annular spacing between inner and outer tubes of a coaxial tubing system comprising an outer tube, having a cross-sectional inner dimension, and a hollow inner tube disposed within the outer tube and having a cross-sectional outer dimension. The spacer has an annular body extending longitudinally between an inner end and an outer end. The body defines: an inner contact surface having a nominal in-use inner dimension corresponding to the outer dimension of the inner tube to abut the inner tube's outer surface; an outer contact surface having a nominal in-use outer dimension corresponding to the inner dimension of the outer tube to abut the outer tube's inner surface; a fluid passage extending longitudinally from the inner end to the outer end to permit fluid between the outer tube and the inner tube to pass the spacer when the spacer is positioned therebetween; and a retention groove defined peripherally about the body along the outer surface to permit receipt of a crimped portion of the outer tube to secure the spacer in a longitudinal position relative to the outer tube.

In accordance with another aspect of the present invention, a coaxial tubing system includes an outer tube, having a cross-sectional inner dimension, and an inner tube, having a cross-sectional outer dimension, disposed within the outer tube. Spacers are provided at each end of the outer tube, and an outer portion of each end of the outer tube is crimped into the retention groove of one of the spacers. A longitudinal fluid passageway is defined between the inner and outer tubes, and across the spacers.

In accordance with another aspect of the present invention, a coaxial tubing system, having at least one bend, includes an outer tube having a cross-sectional inner dimension and having a curved portion and an inner tube, having a cross-sectional outer dimension, disposed within the outer tube and having a curved portion substantially coextensive with the curved portion of the outer tube. Spacers are provided at each end of the outer tube, and an outer portion of each end of the outer tube is crimped into the retention groove of one of the spacers. A longitudinal fluid passageway is defined between the inner and outer tubes, and across the spacers. A bending sleeve is disposed between the inner and outer tubes at such bend and has a length at least coextensive with the curved portions of the tubes. The bending sleeve is provided to transmit bending forces between the outer and inner tubes when the outer tube is subjected to bending, to restricting collapse and limiting deformation of the inner and outer tubes during bending, and to help maintain annular spacing between the inner and outer tubes after bending.

Also in accordance with the invention, a method for forming a coaxial tubing system is provided. The method includes: providing a hollow inner tube suitable for conveying a fluid; providing an outer tube coextensive with a portion of the inner tube, the outer tube having a pair of opposed ends; positioning spacers for maintaining annular spacing between the inner tube and the outer tube; and crimping a portion of the outer tube into a respective retention groove of each of the spacers to form a respective crimped portion, with at least a portion of each of the spacers' inner contact surface abutting the inner tube's outer surface, at least a portion of each of the spacers' outer contact surface abutting the outer tube's inner surface, and the respective crimped portion of the outer tube being seated in the retention groove to secure each respective spacer in a longitudinal position relative to the outer tube.

A method for forming a coaxial tubing system, while avoiding tubing collapse, is also provided. This method includes: forming a sleeve of compression resistant material having a cold flow capability during bending, having a thickness incrementally smaller than the annular spacing between an outer tube and an inner tube, and having at least one radially discontinuous area forming a longitudinal fluid passageway, the sleeve being dimensioned for placement within the outer tube; selecting a portion of the outer tube at which bending is to occur; identifying the portion of the inner tube which is to be placed inside the outer tube substantially coextensive with the selected portion of the outer tube, the inner tube being hollow and suitable for conveying a fluid; placing around the portion of the inner tube a portion of the sleeve that has an in-use hollow cylindrical form with structural continuity over a length substantially coextensive with the portion of the outer tube; placing the sleeve portion/inner tube combination within the portion of the outer tube to form a coaxial tubing system; positioning at least one spacer for maintaining annular spacing between the inner tube and the outer tube, and crimping a portion of the outer tube into a respective retention groove of the at least one spacer to form a respective crimped portion, with at least a portion of the at least one spacer's inner contact surface abutting the inner tube's outer surface, at least a portion of each of the spacer's outer contact surface abutting the outer tube's inner surface, and the crimped portion of the outer tube being seated in the retention groove to secure the at least one spacer in a longitudinal position relative to the outer tube.

For a better understanding of the invention, reference is made to the following description taken in conjunction with the accompanying drawings and the scope of the invention will be pointed out in the accompanying claims.

BRIEF DESCRIPTION OF THE FIGURES

The foregoing and other aspects of the present invention will be understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures in which.

DETAILED DESCRIPTION

Figure 1:
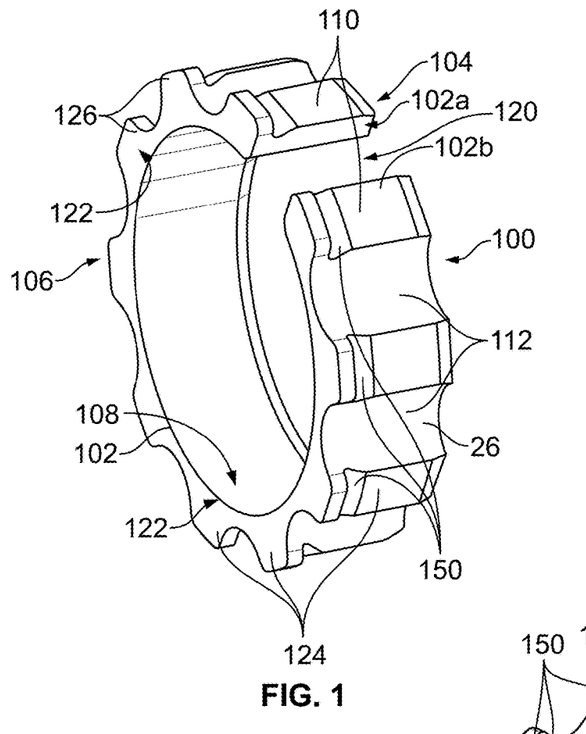
FIGS. 1 and 2 are perspective views of an exemplary securable spacer for use in coaxial tubing systems in accordance with the invention.
Figure 2:
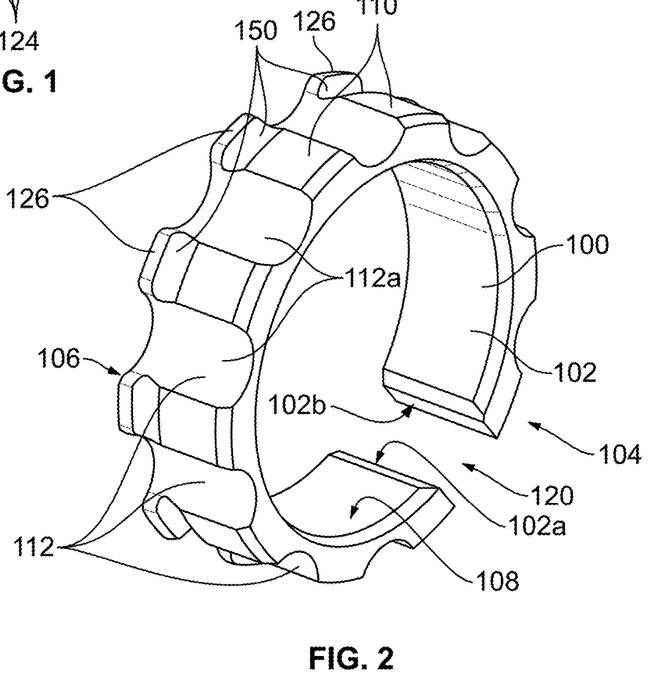
Figures 3, 4:
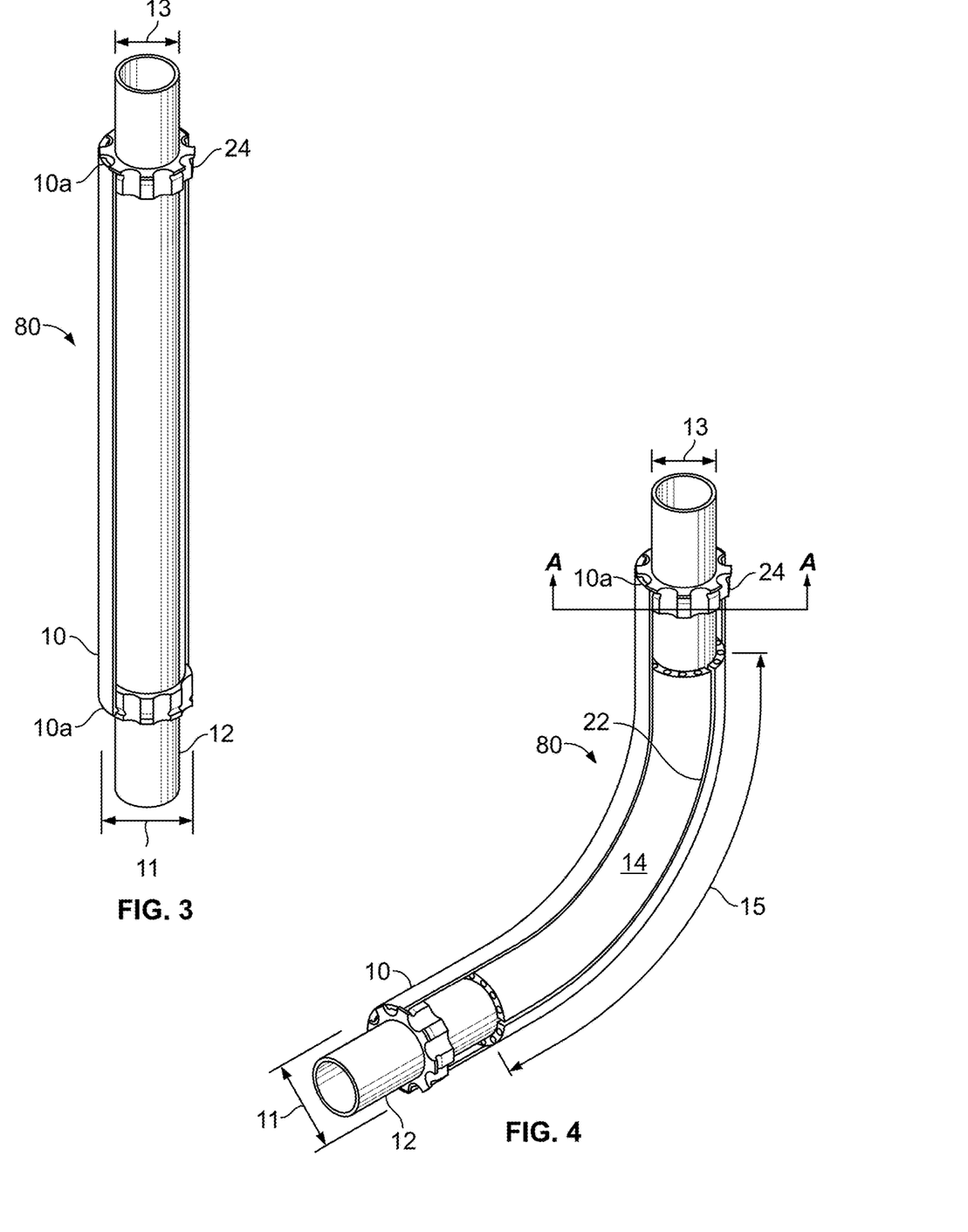
FIGS. 3 and 4 are perspective views of exemplary coaxial tubing system including the securable spacer of FIGS. 1 and 2.

Referring now to FIGS. 1, 2 and 4, a securable spacer 100 in accordance with an exemplary embodiment of the present invention is shown. The securable spacer 100 is configured for maintaining annular spacing between inner and outer tubes of a coaxial tubing system, such as coaxial tubing system 80 shown in FIG. 4, that includes an outer tube 10, having a cross-sectional inner dimension 11, and a hollow inner tube 12 disposed within the outer tube and having a cross-sectional outer dimension 13.

Figure 5:
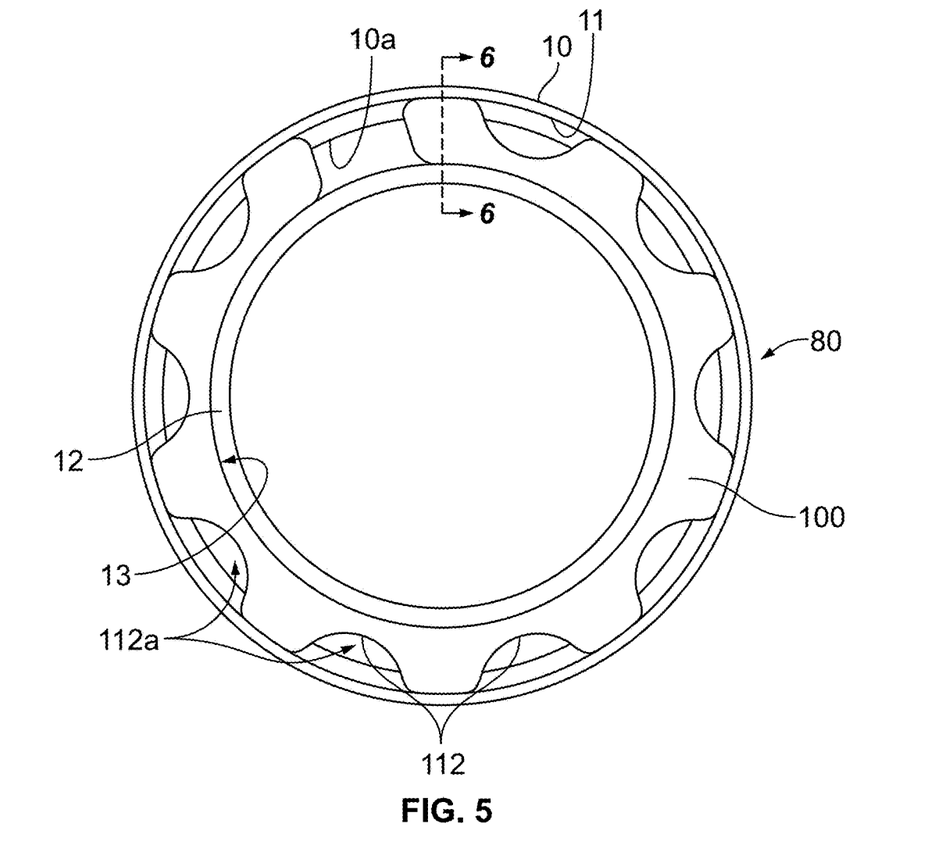
FIG. 5 is a cross-sectional view of the coaxial tubing systems of FIGS. 3 and 4, taken along line A-A of FIGS. 3 and 4.
Figure 6:
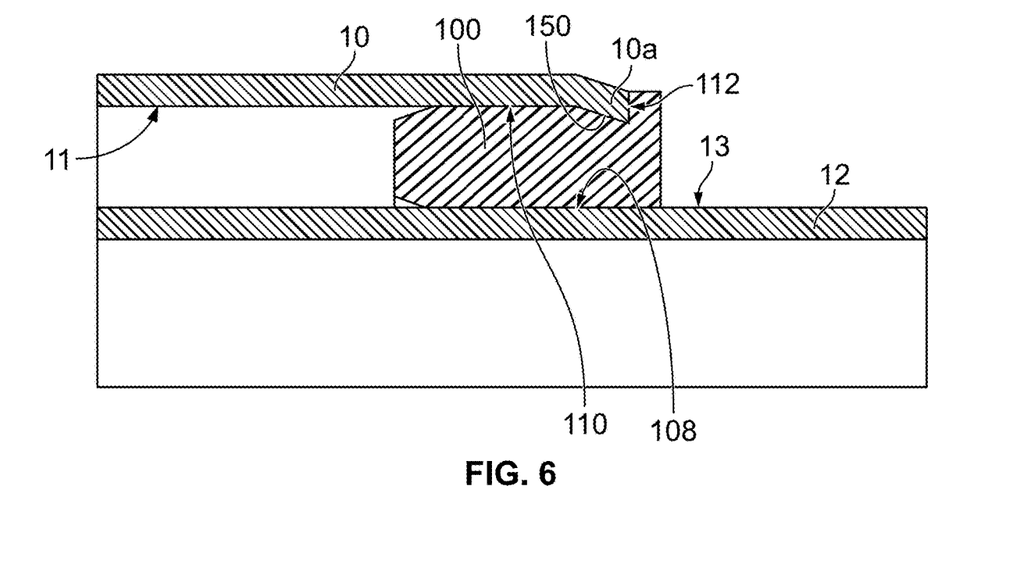
FIG. 6 is a cross-sectional view of the sectional view of the coaxial tubing systems, taken along line B-B of FIG. 5.

The spacer 100 includes an annular body 102 extending longitudinally between an inner end 104 and an outer end 106. The annular body 102 defines an inner contact surface 108 having a nominal in-use inner dimension corresponding to the outer dimension 13 of the inner tube 12 to abut the inner tube's outer surface when positioned between the inner and outer tubes 12, 10, as shown in FIG. 5. As will be appreciated by those skilled in the art, the nominal in-use inner dimension may be incrementally larger (or smaller) than the outer dimension 13 of the inner tube 12, such that the annular body 102 may flex as needed to abut the tubes of the coaxial tubing system as needed to ensure an abutting fit and appropriate material contact, as desired. The actual dimensional difference between the outer dimension 13 and the in-use inner dimension is determined as suitable in particular applications.

In the exemplary embodiment shown in FIGS. 1-6, the annular body 102 is discontinuous peripherally to define an opening 120 between peripheral ends 102a, 102b of the annular body 102. In this embodiment, the discontinuous annular body 102 may flex as needed to conform to the inner tube 12.

Further, the annular body 102 defines an outer contact surface 110 having a nominal in-use outer dimension corresponding to the inner dimension 11 of the outer tube 10, to abut the outer tube's inner surface when in use. In the embodiment shown, the outer contact surface 110 is defined collectively by a plurality of lands 110a, as will be appreciated from FIGS. 1 and 5. As will be appreciated by those skilled in the art, the nominal in-use outer dimension may be incrementally larger (or smaller) than the inner dimension 11 of the outer tube 10, such that the annular body 102 may flex as needed to abut the tubes of the coaxial tubing system as needed to ensure an abutting fit and appropriate material contact, as desired. The actual dimensional difference between the inner dimension 11 and the in-use outer dimension is determined as suitable in particular applications.

Further still, the annular body 102 defines a fluid passage 112 extending longitudinally from the inner end 104 to the outer end 106 to permit fluid between the outer tube and the inner tube to pass the spacer 100, longitudinally, when the spacer is positioned between the inner and outer tubes 12, 10. In the embodiment shown, the fluid passage 112 is defined collectively by a plurality of indentations 112a, as will be appreciated from FIGS. 1 and 5.

Still further, the annular body 102 defines a retention groove 120, which is defined peripherally about the body 102 adjacent the outer contact surface 110, as shown in FIGS. 1 and 2. The retention groove 120 permits receipt of a crimped portion 10a of the outer tube 10 to secure the spacer in a longitudinal position relative to the outer tube 10, as will be appreciated from FIGS. 1, 2, 5 and 6. The crimping of a portion of the outer tube 10 into a retention groove of a spacer to form a crimped portion 10a may be performed in any suitable manner, as will be appreciated by those skilled in the art.

FIG. 3 shows two securable spacers 100 disposed at the terminal portions of the outer tube 10 between the inner and outer tubes 12 and 10 of an unbent (straight) coaxial tubing system 80, with a crimped portion 10a crimped into the retention groove 120 of each spacer 100. FIG. 4 shows two securable spacers 100 disposed at the terminal portions of the outer tube 10 between the inner and outer tubes 12 and 10 of a bent (curved) coaxial tubing system 80, with a crimped portion 10a crimped into the retention groove 120 of each spacer 100. The spacer serves to maintain annular spacing between the inner and outer tubes 12, 10 and prevent vibration of inner tube 12.

By way of example, and as shown in FIGS. 3 and 4, the inner and outer tubes 12, 10 may be cylindrical, the inner contact surface 108 and the outer contact surface 110 of the body 102 are contoured to mate with cylindrical surfaces of the inner tube 12 and the outer tube 10, and the retention groove 120 is configured to receive the crimped portion of a cylindrical outer tube 12.

In certain embodiments, the annular body 102 defines a base portion 122 and a plurality of a plurality of spaced-apart portions 124 extending outwardly, e.g. radially, from the base portion 122, and the indentations 112a are defined by and between adjacent ones of the plurality of spaced-apart portions 124. In this arrangement, the base portion 122 defines the inner contact surface 108 of the annular body 102 having the inner dimension for abutting the outer surface of the inner tube 12, and each of the spaced-apart portions 124 has a respective terminal end 124a, and the respective terminal ends 124a collectively defining the retention groove 120 and the outer contact surface 110 having the outer dimension for abutting the inner surface of the outer tube 10.

Optionally, the spacer 100 may further include stop tabs 126, which extend outwardly from the spaced-apart portions 124 beyond the outer contact 110, so as to be positioned to abut an end of the outer tube 12, as shown in FIGS. 3 and 4. The stop tabs 126 help to prevent the spacer 100 from slipping to a position totally within the outer tube 10, e.g., prior to crimping/final assembly.

In certain embodiments, the retention groove 120 extends immediately adjacent the stop tabs 126, so that the outer tube may be abutted against the stop tabs 126, and then the end portion of the outer tube 12 may be crimped to form a crimped portion seating into the retention groove, during assembly of a coaxial tubing system.

In certain embodiments, the securable spacer 100 is constructed of a conductive material, such as a metallic material such as aluminum, so that the spacer, when assembled as part of a coaxial tubing system, conductively couples the outer tube 12 with the inner tube 10, so as to avoid any electrical arcing or sparking that could ignite fuel or other combustible material carried by the coaxial tubing system. In other embodiments, the securable spacer 100 may be formed of non-conductive material for use in applications in which electrical connection to or grounding of the inner tube is not desired.

Referring now to FIGS. 3 and 4, there are shown portions of coaxial tubing systems 80 without, and with, a bend, respectively. As illustrated, each coaxial tubing system 80 includes an outer tube 10 having a cross-sectional inner dimension, shown as inner diameter 11, and a curved portion as visible in the drawing. In FIG. 4, a portion of the right side of tube 10 has been removed for illustrative purposes. Inner tube 12 has a cross-sectional outer dimension, shown as outer diameter 13, and is disposed within the outer tube 10. As illustrated, inner tube 12 has a curved portion which is substantially coextensive with the curved portion of outer tube 10. Tubes 10 and 12 may typically be tubes of aluminum or other material of circular cross section, providing desired attributes of strength and weight.

With respect to the bent coaxial tubing system 80 of FIG. 4, the coaxial tubing system 80 also includes bending sleeve means, shown as bending sleeve 14, disposed between the inner tube 12 and outer tube 10 at the bend in the tubing system and having a length 15 which is at least coextensive with the curved portions of tubes 10 and 12. As will be further discussed, the bending sleeve means 14 is configured and has characteristics effective: (a) for transmitting bending forces to, from and between the inner tube 12 and the outer tube 10 when outer tube 10 is subjected to bending, (b) for restricting collapse and limiting deformation of the tubes during bending, and (c) for maintaining annular spacing between tubes 12 and 10 after bending, when the tubes and bending sleeve have the configuration illustrated in FIG. 4.

Figure 7:
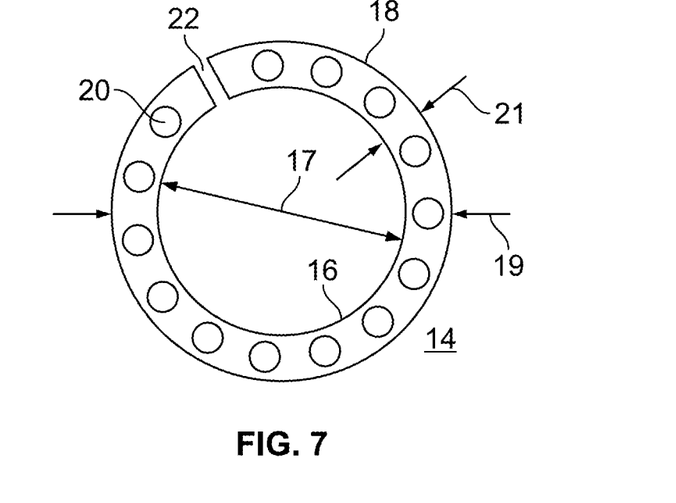
FIGS. 7 and 8 show details of a bending sleeve of FIG. 4.
Figure 8:
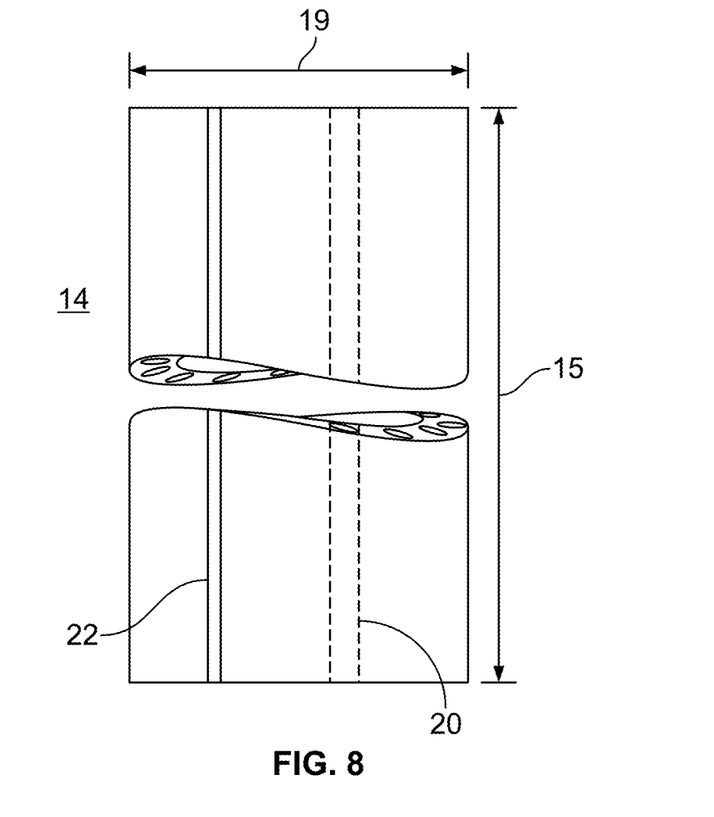

The bending sleeve means of FIG. 4 comprises a structural member shown in greater detail in the respective end and side views of FIGS. 7 and 8, which are drawn to a larger scale than FIG. 4. As shown in these drawings, the structural member 14, which may be formed of extruded polymer-type material, such as "TEFLON", is comprised of a plurality of component functional means arranged in a cooperating combination. Inner means comprise the inner portion 16 having a nominal in-use inner dimension, shown as diameter 17, which is incrementally larger than the outer dimension 13 of the inner tube 12. This dimensioning enables the bending sleeve to be positioned around a to-be-bent portion of inner tube 12 prior to the to-be-bent portion of tube 12 being placed within outer tube 10. The actual dimensional difference between the outer dimension 13 and the in-use inner dimension 17 is determined as suitable in particular applications. Thus, such difference may be effective to provide a frictional fit so that sleeve 14 remains in the position at which it is placed around tube 12, or may be larger so that sleeve 14 slips readily and is held in place by thermal shrinking of sleeve 14, by annular retainer bands which grip tube 12 at the ends of sleeve 14, or by other arrangements.

Outer means of the structural member 14 comprise the outer portion 18 having a nominal in-use outer dimension, shown as diameter 19 in FIG. 7, which is incrementally smaller than the inner dimension 11 of outer tube 10. This dimensioning enables the inner tube 12, with bending sleeve 14 positioned around it, to be placed within a to-be-bent portion of the outer tube 10. The actual dimensional difference between the in-use outer dimension 19 and inner dimension 11 is typically determined so that with bending sleeve 14 around inner tube 12 there will still be adequate clearance to permit the inner tube/bending sleeve combination to readily slide into outer tube 10, while leaving only a small tolerance between dimensions 19 and 11. The actual dimensions and tolerances can be determined as suitable in particular applications.

Fluid passage means of the structural member 14 comprise one or more holes indicated typically at 20 in FIG. 7, and a representative one of which is shown dotted in FIG. 8, in this embodiment. The fluid passage holes 20, are arranged to provide fluid passageways longitudinally between the inner and outer tubes 12 and 10, to provide venting of the system. It will thus be seen that the outer and inner means each comprise a circular portion of the structural member 14, which has a thickness 21 between its inner and outer surfaces, and the fluid passage holes 20 extend longitudinally between those surfaces in this embodiment.

An additional feature of the bending sleeve, which may be incorporated in certain embodiments, is a longitudinal cut 22 which extends radially through structural member 14 from its center outward. In an extruded form of bending sleeve, cut 22 may, for example, be formed during the extrusion process or may be implemented by a cutting action following extrusion. Cut 22 permits the structural member 14 to be produced in a form having an actual inner dimension 17 which is smaller than outer dimension 13 of tube 12. This enables the member 14 to be spread apart at cut 22 adequately to permit positioning around tube 12. Subsequent contraction, resulting from shape retention characteristics, provides a gripping action adequate to hold member 14 in place around tube 12. Thus, while in the longitudinally cut form of the bending sleeve 14 the original inner dimension 17 may be smaller than dimension 13, nevertheless the in-use inner dimension of bending sleeve 14 will necessarily be incrementally larger than dimension 13. In view of this, for purposes of the specification and claims, the term "in-use dimension" (inner or outer) is defined as the dimension the relevant means or element will have when positioned in place around a tube or in a coaxial tubing system.

Figure 9:
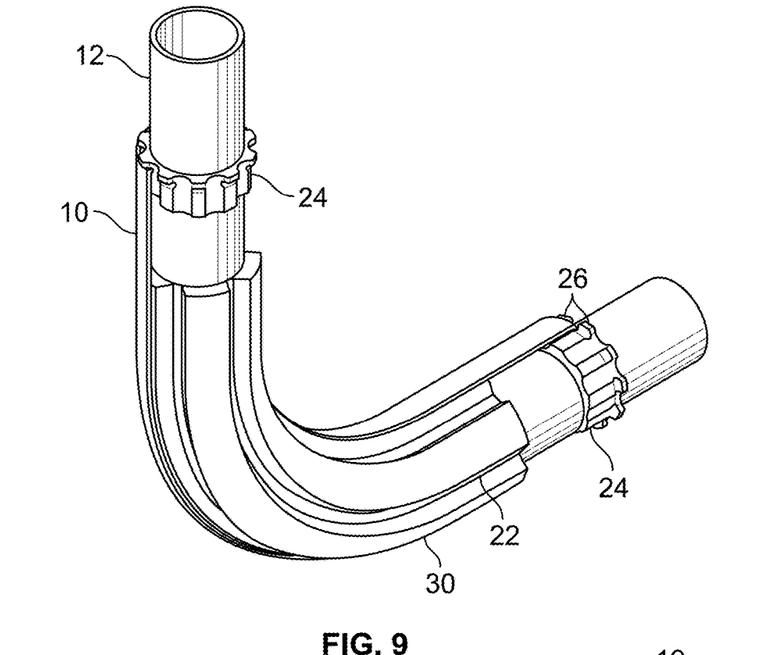
FIGS. 9, 10 and 11 illustrate an alternative coaxial tubing system including the securable spacer and an alternative embodiment of a bending sleeve.
Figure 10:
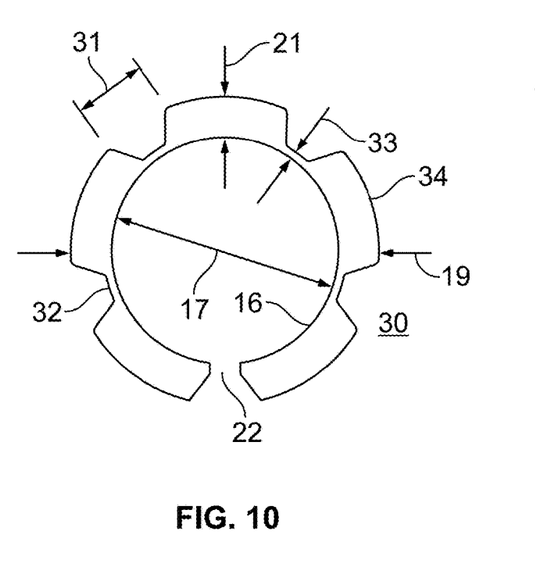
Figure 11:
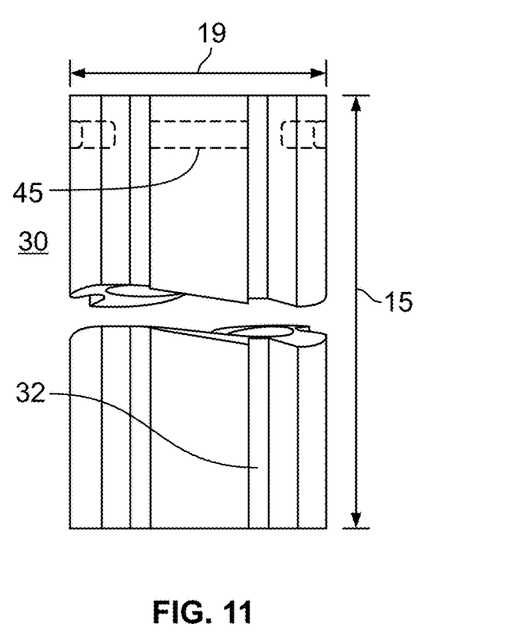
Figure 12A:
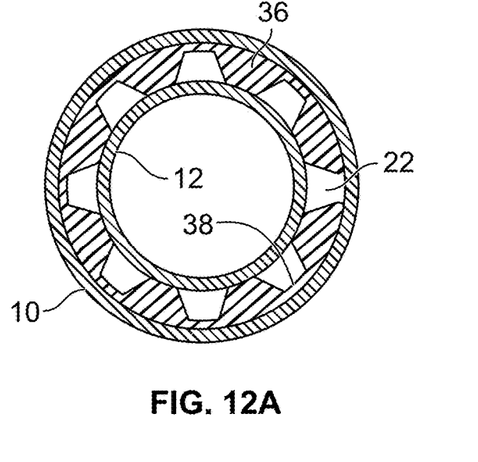
FIGS. 12A, 12B, 13A, 13B, 14A, 14B, 15A and 15B are cross-sectional views of coaxial tubing systems using other forms of bending sleeves.
Figure 12B:
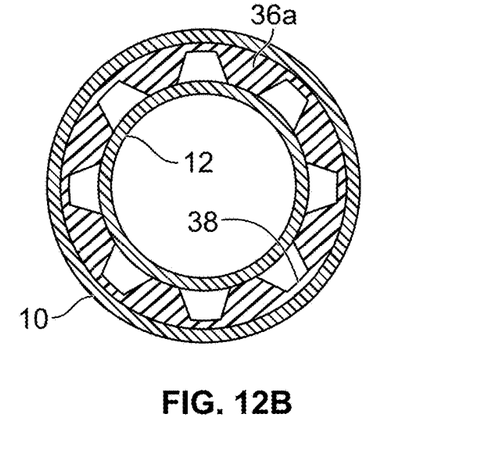
Figure 13A:
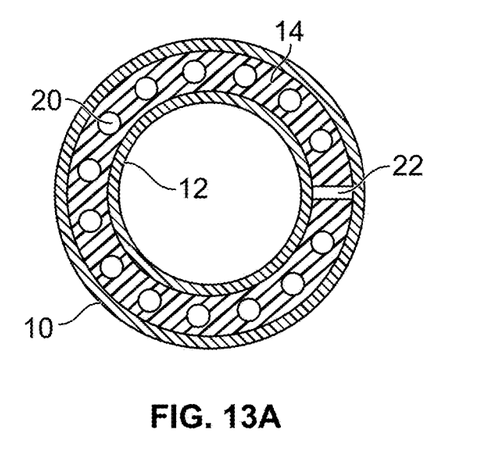
Figure 13B:
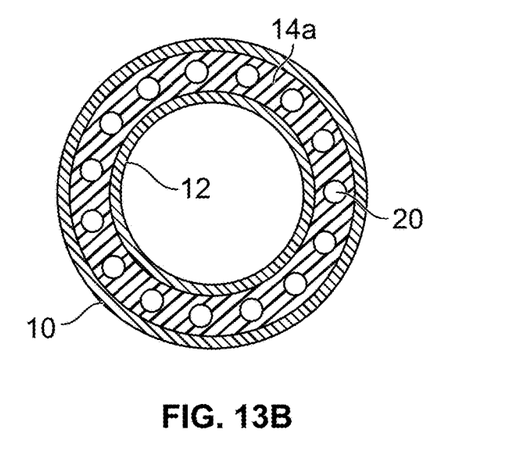
Figure 14A:
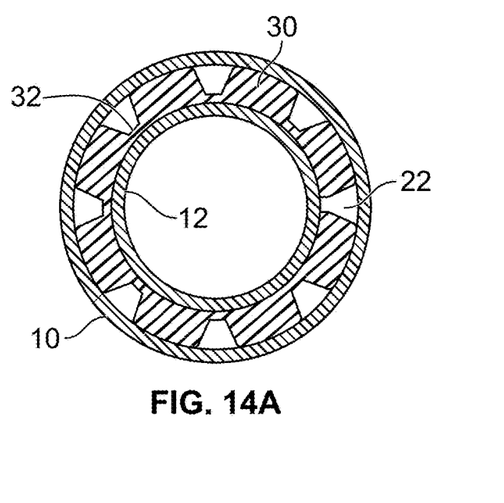
Figure 14B:
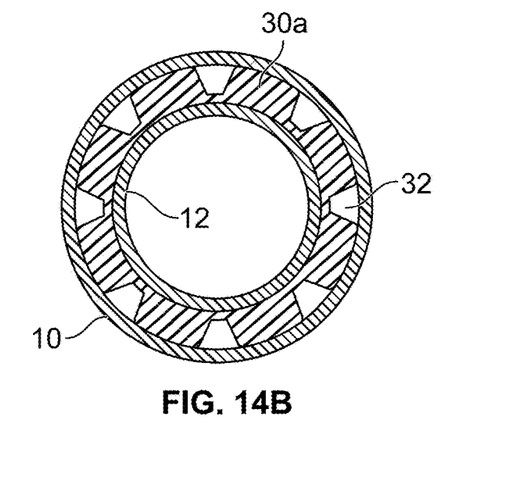
Figure 15A:
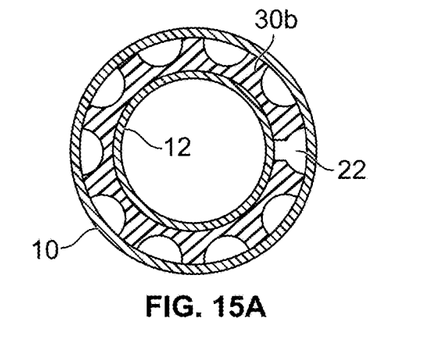

With reference now to FIGS. 9, 10 and 11, there is illustrated a coaxial tubing system utilizing a different embodiment of a bending sleeve in accordance with the invention. As shown in the end view of FIG. 10, in this embodiment bending sleeve 30, for facilitating a bend in a coaxial tubing system, includes inner means 16 having a nominal in-use dimension 17, which is the diameter of a circle. However, there are no holes longitudinally through the constituent material of the bending sleeve. Instead, fluid passage means comprise a plurality of spaced-apart portions 34 embodied as outer means cross-sectionally configured to lie on a circle and one or more indented areas as shown at 32. Indented areas 32 are effective to provide longitudinal fluid passageways between the inner and outer tubes in the assembled tube system shown in FIG. 9 with a portion of outer tube 10 removed for illustration. As illustrated, bending sleeve 30 includes four indented areas 32, each of which has a nominal width 31 and a depth leaving a nominal thickness 33 within each indented area 32. Bending sleeve 30, which is shown in side view in FIG. 15, functions in the same manner as the FIG. 1 embodiment.

Figure 15B:
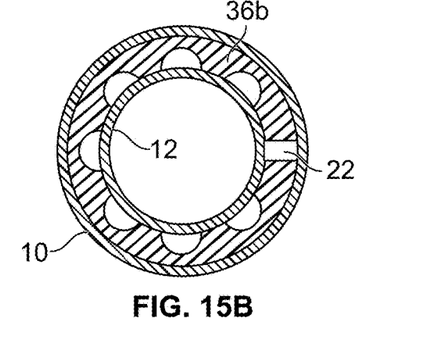

Referring now to the various views of FIGS. 12A through 15B, there are illustrated end views of coaxial tubing systems incorporating different embodiments of bending sleeves in accordance with the invention. FIGS. 12A and 12B, FIGS. 13A and 13B, and FIGS. 14A and 14B respectively show split and unsplit versions of bending sleeves 36, 14 and 30. Bending sleeves 14 and 30 include longitudinal holes 20 and indentations 32 of the same types as respectively shown in and discussed with reference to FIGS. 7 and 10. Bending sleeves 36 and 36a in FIGS. 12A and 12B include indentations 38 formed and dimensioned so that the inner means, in both the cut and circumferentially continuous versions, comprises a plurality of spaced-apart portions cross-sectionally configured to lie on a circle around the outer circumference of tube 12, as shown. This is contrasted to the bending sleeves 30 and 30a in FIGS. 14A and 14B, the outer means of which include spaced-apart portions (between indentations 32) cross-sectionally configured to lie on a circle which is incrementally smaller than the inner diameter of outer tube 10. FIGS. 15A and 15B respectively show bending sleeve types 30b and 36b having outwardly extending and inwardly extending portions separated by indentations of half-cylindrical form providing the desired longitudinal fluid passageways between the inner and outer tubes 12 and 10. The embodiments shown are illustrative of the many possible configurations which can be provided by skilled individuals in particular applications.

Figure 16A:
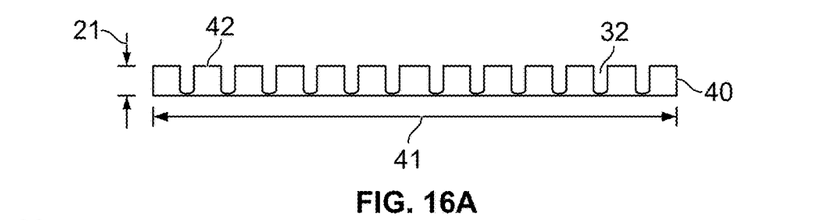
FIGS. 16A, 16B, 16C, 17A, 17B and 18 illustrate use of bending sleeves formed of planar stock material that may be used in coaxial tubing systems in accordance with the present invention.
Figures 16B, 16C, 17A, 17B, 18:
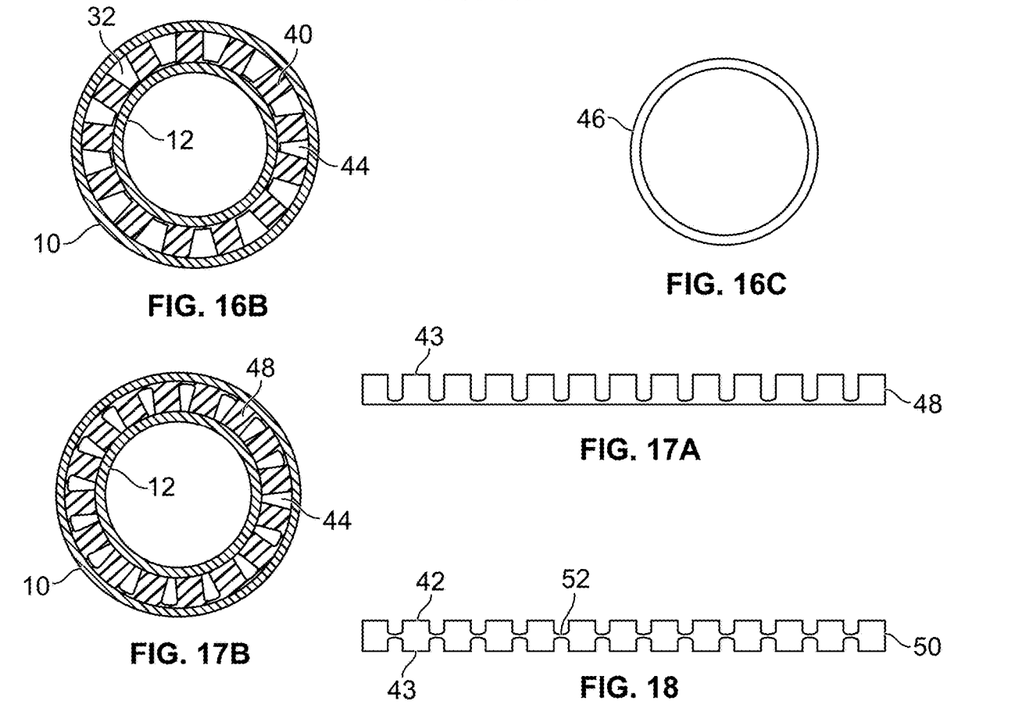

FIG. 16A illustrates a bending sleeve 40 which comprises a section of material of basically planar form having a length normal to the surface of the drawing as specified with reference to length 15 in FIG. 4 and a width 41 having a predetermined relation to the outer dimension of the inner tube 12. As represented in FIG. 16B, width 41 may desirably be somewhat smaller than the distance represented by the outer circumference of tube 12 so as to leave a gap 44, corresponding to cut 22 discussed earlier. Indentations 32 are included to provide longitudinal fluid passageways, as previously discussed. Bending sleeve 40 additionally has a thickness 21 which is smaller than the difference between the inner diameter of outer tube 10 and the outer diameter of inner tube 12. The spaced-apart portions of bending sleeve 40 may desirably be formed with convex curved upper extremities as indicated at 42. With this dimensioning, bending sleeve 40 as shown in FIG. 20A is capable of being formed into the substantially annular shape shown in FIG. 20B for positioning around inner tube 12 and permitting tube 12 with sleeve 40 around it to be inserted within outer tube 10. When formed into such annular shape, it will be appreciated that in side view the bending sleeve 40 will resemble the FIG. 11 side view of sleeve 30. By specifying the curvature of the upper extremities at 42 to correspond to the curvature of the inside surface of outer tube 10, as shown in FIG. 16B, an improved operative combination can be achieved. As represented in dashed form at 45 in FIG. 10, bending sleeve 40 may include laterally extending grooves suitable for receiving one or more elastic rings 46, such as shown in FIG. 16C, which can be positioned to encircle the formerly planar section of material 40 which has been formed into annular shape as shown in FIG. 16B. The elastic rings such as 46 are thus effective to help maintain the substantially annular shape during assembly.

FIG. 17A illustrates an alternative form of material section 48 in order to indicate the variety of planar type embodiments which may be provided for different applications. FIG. 17B shows section 48 in place in a coaxial tubing system including inner and outer tubes 12 and 10. In this embodiment the upper extremities of the spaced-apart portions of bending sleeve 48 are formed with concave shaping as indicated at 43. The curvature at 43 desirably corresponds to the outside surface of inner tube 12, as illustrated in FIG. 17B. FIG. 18 shows an additional configuration in the form of bending sleeve 50. Sleeve 50 comprises a section of material of basically planar form corresponding generally to sleeve sections 40 and 48, but having spaced apart portions extending upward and downward from intermediate interconnecting portions 52. As shown in FIG. 8, the upward extending portions have convex curved upper extremities, as indicated at 42, and the downward extending portions have concave curved extremities, as indicated at 43. Bending sleeve 50 can thus be positioned between outer tube 10 and inner tube 12, in the manner of sleeve 48 in FIG. 17B, with curvatures of 42 and 43 of bending sleeve 50 corresponding to the inner and outer diameters of tubes 10 and 12, respectively. With knowledge of the invention, particular configurations of bending sleeves of these types, with flat or curved extremities, can be specified as appropriate in particular applications.

In accordance with the present invention, a method for forming a coaxial tubing system using a securable spacer comprise the following providing a hollow inner tube suitable for conveying a fluid, and an outer tube coextensive with a portion of the inner tube method further includes positioning securable spacers for maintaining annular spacing between the inner tube and the outer tube, e.g., at the opposed ends of the outer tube. This may involve moving each end of the outer tube into abutting relationship with a stop tab of the securable spacer. The method further includes crimping a portion (e.g., an end) of the outer tube into a retention groove of each of the spacers to form a crimped portion.

In certain embodiments, the spacer includes a stop tab extending outwardly beyond the outer contact surface. In some such embodiments, positioning spacers for maintaining annular spacing between the inner and outer tubes may include positioning each spacer within an end of the outer tube in abutting relationship to the spacer's stop tab.

In this manner, a coaxial tubing system is formed in which at least a portion of each of each spacer's inner contact surface abuts the inner tube's outer surface, at least a portion of each of spacer's outer contact surface abuts the outer tube's inner surface, and a crimped portion of the outer tube is seated in a retention groove of a respective spacer to secure the spacer in a longitudinal position relative to the outer tube.

With respect to bent coaxial tubing systems, a method for bending a coaxial tubing system, while avoiding collapse of either of the tubes, is also provided (see the configuration shown in FIGS. 4, 7 and 8). The method includes forming a sleeve 14 of compression resistant material having a cold flow capability during bending, having a thickness 21 incrementally smaller than the annular between an outer tube 10 and an inner tube 12, and having at least one radially discontinuous area forming a longitudinal fluid passageway. Thus, the holes 20 extend longitudinally and represent radial discontinuities between the inner and outer surfaces of sleeve 14. By forming sleeve 14 from polytetrafluoroethylene as its constituent material, sleeve 14 is imbued with self-lubricating and cold flow characteristics which permit stretching and compression of various portions of the walls of the inner and outer tubes 10 and 12, while preventing collapse or wrinkling of the tubes and limiting tube deformation.

The method also includes selecting a portion of outer tube 10 at which bending is to occur. This may be the portion of tube 10 in FIG. 4 which is coextensive with, but somewhat shorter than, the length 15 of sleeve 14.

The method further includes identifying the portion of inner tube 12 which is to be placed inside the outer tube 10 substantially coextensive with the selected portion of the tube 10.

Still further, the method includes placing around the portion of tube 12 a portion 14 of the sleeve that has a length substantially coextensive with the selected portion of tube 10. This portion of sleeve 14 has a length 15 as indicated in FIG. 4, which may desirably extend about one-half inch past bent portions of the tubes after bending of tubes whose diameter is of the order of one inch. At this point, the sleeve may be retained in place on tube 12 by friction, restrictive heat treatment, clamping devices placed around the sleeve or around tube 12 at the ends of sleeve 14, etc., as appropriate in the particular application.

Also, the method includes placing the sleeve portion/inner tube combination 14/12 within the selected portion of tube 10 to form a coaxial tubing system.

Further, the method includes positioning at least one securable spacer 100 for maintaining annular spacing between the inner tube 12 and outer tube 10.

Further still, the method includes bending the coaxial tubing system applying bending force to outer tube 10 so that bending force is transmitted to, from and between tubes 12 and 10, by sleeve portion 14.

Still further, the method includes crimping a portion of the outer tube 10 into a respective retention groove 150 of at least one spacer 100 to form a respective crimped portion 10a.

In this manner, a coaxial tubing system is formed in which at least a portion of each of each spacer's inner contact surface abuts the inner tube's outer surface, at least a portion of each of spacer's outer contact surface abuts the outer tube's inner surface, and a crimped portion of the outer tube is seated in a retention groove of a respective spacer to secure the spacer in a longitudinal position relative to the outer tube.

It will be appreciated that if no bending sleeve is used, or if some intermediate means lacking the properties and construction of sleeve 14 is used, bending of inner and outer tubes 12 and 10 cannot be controlled as desired, so that tube collapse, wrinkling or deformation can be expected. Also, no longitudinal fluid passageway will be available.

As an alternative to the above method, the step of placing around the portion of the inner tube a portion of the sleeve that has an in-use hollow cylindrical form with structural continuity over a length substantially coextensive with the portion of the outer tube and the step of placing the sleeve portion/inner tube combination within the portion of the outer tube to form a coaxial tubing system can be respectively replaced by the following steps: first, placing the portion of identified inner tube 12 within the identified portion of outer tube 10; and then, inserting between tubes 12 and 10 a portion 14 of the sleeve which has a length substantially coextensive with the selected portion of tube 10 (e.g., length 15) and move sleeve portion 14 to a position in which it is substantially coextensive with the referenced portions of tubes 12 and 10. The desired movement of sleeve portion 14 to the appropriate position can be readily accomplished by use of a suitable plastic or other non-scratching assembly tube of dimensions enabling it to easily fit between the inner and outer tubes. The assembly tube is used to push the sleeve portion to its desired location and is then removed.

These methods are suitable for assembly and bending coaxial tubing systems including two tubes (or three or more coaxial tubes with two or more suitable bending sleeves). Available types of tube bending mandrels, assemblies, machines and procedures can be utilized or adapted to perform actual bending. Skilled persons will be capable of readily making any modifications in prior hardware and techniques as appropriate. For example, increased bending resistance will be encountered in bending coaxial tubing systems, as compared to single tubes.

It should be noted that any suitable sequence may be used for assembly of the securable spacer(s) 100 as part of a curved/bent or straight/unbent coaxial tubing system.

As described above, such spacers 100 are effective to maintain desired annular spacing between tubes 10 and 12 and may provide an inner tube electrical grounding capability in certain applications. With respect to curved/bent coaxial tubing systems, spacers 100 having a split ring configuration as shown in FIGS. 1-6 can be designed to be held in place, at least partially, by a constricting action around the inner tube after installation. Even without such action, a non-split spacer slightly larger in inner diameter than inner tube 12 will be held in place by the lateral biasing force required to move and hold inner tube 12 to a centered position within tube 10 against the springback force present after bending has taken place. With respect to both curved/bent and straight/unbent coaxial tubing systems, crimping of a portion of the outer tube 10 into the retention groove 120 of the spacer provides for positive interlocking of the spacer and thus serves to mechanically secure the spacer 100 to the tube 10/tubing system 80, and to fix the spacer into a longitudinal position relative to the inner and outer tubes 12, 10 and tubing system 80.

In application of the invention numerous alternative embodiments and variations will be apparent. Thus, the longitudinal fluid passageways may be spirally longitudinal from one end of the bending sleeve to the other, rather than extending in a direction strictly normal to the cross-sectional diameter as illustrated. Sections of bending sleeve may be used simply as spacers in tube runs between bends, while still providing desired fluid passageways. The between-tube fluid passageways are usable as an additional fluid carrying conduit and it may be desirable to provide for monitoring of the presence in such fluid of contamination, in order to permit early identification of a leak in the wall of the inner tube. Also, the between-tube passageways are usable for introduction of a gas or liquid for cooling or heating of the inner tube 12, or for a return flow conduit. In the latter case fluids may flow in opposite directions within tube 12 and the surrounding fluid passageways. Coaxial bend assemblies using the invention may typically be more economical, half the weight, and more reliable than prior corner joints and shrouds. Also, since the bending sleeve is effectively fixed in place during the bending process, it remains reliably in place after bending, providing support for the inner tube and reducing vibration and possible vibrational fatigue.

While there have been described the presently preferred embodiments of the invention, those skilled in the art will recognize that other and further modifications and variations may be made without departing from the invention. It is therefore intended to claim all such modifications and variations as fall within the scope of the invention.

What is claimed is:

1. A spacer for maintaining annular spacing between inner and outer tubes of a coaxial tubing system comprising an outer tube, having a cross-sectional inner dimension, and a hollow inner tube disposed within the outer tube and having a cross-sectional outer dimension, said spacer comprising:
    an annular body extending longitudinally between an inner end and an outer end, said body defining:
        an inner contact surface having a nominal in-use inner dimension corresponding to the outer dimension of the inner tube to abut the inner tube's outer surface;
        an outer contact surface having a nominal in-use outer dimension corresponding to the inner dimension of the outer tube to abut the outer tube's inner surface;
        a fluid passage extending longitudinally from said inner end to said outer end to permit fluid between the outer tube and the inner tube to pass said spacer when said spacer is positioned therebetween; and
        a retention groove defined peripherally about said body adjacent said outer surface to permit receipt of a crimped portion of the outer tube to secure said spacer in a longitudinal position relative to the outer tube.

2. The spacer of claim 1, wherein said spacer is constructed of a conductive material to conductively couple the outer tube with the inner tube.

3. The spacer of claim 1, wherein said annular body is discontinuous peripherally to define an opening between peripheral ends of said annular body.

4. The spacer of claim 1, wherein said annular body defines a base portion and a plurality of a plurality of spaced-apart portions extending from said base portion.

5. The spacer of claim 4, wherein said base portion defines said inner contact surface of said body having said inner dimension for abutting the outer surface of the inner tube, said plurality of spaced-apart portions extend outwardly from said base portion, and wherein each of said plurality of spaced-apart portions has a respective terminal end, said respective terminal ends collectively defining said retention groove and said outer contact surface having said outer dimension for abutting the inner surface of the outer tube.

6. The spacer of claim 5, wherein each of said plurality of spaced-apart portions further comprises a respective stop tab extending outwardly beyond said outer contact surface.

7. The spacer of claim 5, wherein said retention groove of said body is configured to receive the crimped portion of a cylindrical outer tube.

8. The spacer of claim 1, wherein said inner contact surface and said outer contact surface of said body are contoured to mate with cylindrical surfaces of the inner tube and the outer tube.

9. The spacer of claim 1, wherein said body further comprises at least one stop tab extending positioned to abut an end of said outer tube.

10. The spacer of claim 1, where said retention groove extends immediately adjacent said at least one stop tab.

11. A coaxial tubing system comprising:
   an outer tube having a cross-sectional inner dimension;
   a hollow inner tube suitable for conveying a fluid, said inner tube having a cross-sectional outer dimension, disposed within said outer tube; and
   a spacer for maintaining annular spacing between said inner tube and said outer tube, said spacer comprising:
   an annular body extending longitudinally between an inner end and an outer end, said body defining:
      an inner contact surface having an inner dimension corresponding to said outer dimension of said inner tube;
      an outer contact surface having an outer dimension corresponding to said inner dimension of said outer tube;
   a fluid passage extending longitudinally from said inner end to said outer end of said spacer to permit fluid between said outer tube and said inner tube to pass said spacer; and
   a retention groove defined peripherally about said body adjacent said outer contact surface;
   said spacer's inner contact surface abutting said inner tube's outer surface, said spacer's outer contact surface abutting said outer tube's inner surface, and a crimped portion of said outer tube being seated in said retention groove to secure said spacer in a longitudinal position relative to said outer tube.

12. The coaxial tubing system of claim 11, wherein said spacer is constructed of a conductive material to conductively couple said outer tube's inner surface with said inner tube's outer surface.

13. The coaxial tubing system of claim 11, wherein said annular body is discontinuous peripherally to define an opening between peripheral ends of said annular body.

14. The coaxial tubing system of claim 11, wherein said annular body defines a base portion and a plurality of a plurality of spaced-apart portions extending from said base portion.

15. The coaxial tubing system of claim 14, wherein said base portion abuts said outer surface of said inner tube, said plurality of spaced-apart portions extend outwardly from said base portion, and wherein each of said plurality of spaced-apart portions has a respective terminal end, said respective terminal ends collectively defining said retention groove and said outer contact surface abutting said inner surface of said outer tube.

16. The coaxial tubing system of claim 15, wherein each of said plurality of spaced-apart portions further comprises a respective stop tab extending outwardly beyond said outer contact surface.

17. The coaxial tubing system of claim 16, where said retention groove extends immediately adjacent said stop tabs.

18. The coaxial tubing system of claim 11, wherein said outer tube has at least one bend, said outer tube having a curved portion, said inner tube having a curved portion substantially coextensive with said curved portion of said outer tube, said coaxial tubing system further comprising:
   a bending sleeve, disposed between said inner and outer tubes at said bend and having structural continuity over a length at least coextensive with said curved portions of said inner and outer tubes, said bending sleeve transmitting bending forces between said outer and inner tubes when said outer tube is subjected to bending, restricting collapse and limiting deformation of said inner and outer tubes during bending and maintaining annular spacing between said inner and outer tubes after bending, said bending sleeve comprising a hollow cylindrical structural member having:
      an inner portion, having a nominal in-use inner dimension incrementally larger than said outer dimension of said inner tube, said inner portion enabling said bending sleeve to be positioned around a to-be-bent portion of said inner tube;
      an outer portion, having a nominal in-use outer dimension incrementally smaller than said inner dimension of said outer tube, for enabling said inner tube with said bending sleeve positioned around it to be placed within a to-be-bent portion of said outer tube; and
      fluid passages providing a longitudinal fluid passageway between said inner and outer tubes.

19. The coaxial tubing system of claim 18, wherein said annular body defines a base portion and a plurality of a plurality of spaced-apart portions extending from said base portion.

20. The coaxial tubing system of claim 19, wherein said base portion abuts said outer surface of said inner tube, said plurality of spaced-apart portions extend outwardly from said base portion, and wherein each of said plurality of spaced-apart portions has a respective terminal end, said respective terminal ends collectively defining said retention groove and said outer contact surface abutting said inner surface of said outer tube.

21. The coaxial tubing system of claim 20, wherein each of said plurality of spaced-apart portions further comprises a respective stop tab extending outwardly beyond said outer contact surface.

22. The coaxial tubing system of claim 21, where said retention groove extends immediately adjacent said stop tabs.

23. The coaxial tubing system of claim 11, wherein said outer tube has at least one bend, said outer tube having a curved portion, said inner tube having a curved portion substantially coextensive with said curved portion of said outer tube, said coaxial tubing system further comprising:
   bending sleeve means, disposed between said inner and outer tubes at said bend and having structural continuity over a length at least coextensive with said curved portions of said inner and outer tubes for transmitting bending forces between said outer and inner tubes when said outer tube is subjected to bending, for restricting collapse and limiting deformation of said inner and outer tubes during bending and for maintaining annular spacing between said inner and outer tubes after bending, said bending sleeve means comprising a hollow cylindrical structural member having:
      inner means, having a nominal in-use inner dimension incrementally larger than said outer dimension of said inner tube, said inner portion enabling said bending sleeve means to be positioned around a to-be-bent portion of said inner tube;

outer means, having a nominal in-use outer dimension incrementally smaller than said inner dimension of said outer tube, for enabling said inner tube with said bending sleeve means positioned around it to be placed within a to-be-bent portion of said outer tube; and fluid passage means for providing a longitudinal fluid passageway between said inner and outer tubes.

24. The coaxial tubing system of claim 23, wherein said annular body defines a base portion and a plurality of a plurality of spaced-apart portions extending from said base portion.

25. The coaxial tubing system of claim 24, wherein said base portion abuts said outer surface of said inner tube, said plurality of spaced-apart portions extend outwardly from said base portion, and wherein each of said plurality of spaced-apart portions has a respective terminal end, said respective terminal ends collectively defining said retention groove and outer contact surface abutting said inner surface of said outer tube.

26. The coaxial tubing system of claim 25, wherein each of said plurality of spaced-apart portions further comprises a respective stop tab extending outwardly beyond said outer contact surface.

27. The coaxial tubing system of claim 26, where said retention groove extends immediately adjacent said stop tabs.

28. A method for forming a coaxial tubing system comprising:

providing a hollow inner tube suitable for conveying a fluid;

providing an outer tube coextensive with a portion of said inner tube, said outer tube having a pair of opposed ends;

positioning spacers for maintaining annular spacing between said inner tube and said outer tube, each spacer comprising:
an annular body extending longitudinally between an inner end and an outer end, said body defining:
an inner contact surface having an inner dimension corresponding to an outer dimension of said inner tube;
an outer contact surface having an outer dimension corresponding to an inner dimension of said outer tube;
a fluid passage extending longitudinally from said inner end to said outer end of said spacer to permit fluid between said outer tube and said inner tube to pass said spacer; and
a retention groove defined peripherally about said body along said spacer; and crimping a portion of said outer tube into a respective retention groove of each of said spacers to form a respective crimped portion;

at least a portion of each of said spacers' inner contact surface abutting said inner tube's outer surface, at least a portion of each of said spacers' outer contact surface abutting said outer tube's inner surface, and the respective crimped portion of said outer tube being seated in said retention groove to secure each respective spacer in a longitudinal position relative to said outer tube.

29. The method of claim 28, wherein said spacer comprises a respective stop tab extending outwardly beyond said outer contact surface, and wherein positioning spacers for maintaining annular spacing between said inner tube and said outer tube comprises positioning each spacer within an end of said outer tube abutting said spacer's stop tab.

30. A method for forming a coaxial tubing system, while avoiding tubing collapse, comprising the steps of:

forming a sleeve of compression resistant material having a cold flow capability during bending, having a thickness incrementally smaller than the annular spacing between an outer tube and an inner tube, and having at least one radially discontinuous area forming a longitudinal fluid passageway, said sleeve being dimensioned for placement within said outer tube;

selecting a portion of said outer tube at which bending is to occur;

identifying the portion of said inner tube which is to be placed inside said outer tube substantially coextensive with said selected portion of said outer tube, said inner tube being hollow and suitable for conveying a fluid;

placing around said portion of said inner tube a portion of said sleeve that has an in-use hollow cylindrical form with structural continuity over a length substantially coextensive with said portion of said outer tube;

placing said sleeve portion/inner tube combination within said portion of said outer tube to form a coaxial tubing system;

positioning at least one spacer for maintaining annular spacing between said inner tube and said outer tube, each spacer comprising:
an annular body extending longitudinally between an inner end and an outer end, said body defining:
an inner contact surface having an inner dimension corresponding to an outer dimension of said inner tube;
an outer contact surface having an outer dimension corresponding to an inner dimension of said outer tube;
a fluid passage extending longitudinally from said inner end to said outer end of said spacer to permit fluid between said outer tube and said inner tube to pass said spacer; and
a retention groove defined peripherally about said body along said spacer;

bending said coaxial tubing system by applying bending force to said outer tube so that said bending force is transmitted between said inner and outer tubes, by said sleeve portion, without collapse of said outer tube or said inner tube; and crimping a portion of said outer tube into a respective retention groove of said at least one spacer to form a respective crimped portion;

at least a portion of said at least one spacer's inner contact surface abutting said inner tube's outer surface, at least a portion of each of said spacer's outer contact surface abutting said outer tube's inner surface, and the crimped portion of said outer tube being seated in said retention groove to secure said at least one spacer in a longitudinal position relative to said outer tube.

31. The method of claim 30, wherein said at least one spacer comprises a respective stop tab extending outwardly beyond said outer contact surface, and wherein positioning at least one spacer for maintaining annular spacing between said inner tube and said outer tube comprises positioning said at least one spacer within an end of said outer tube abutting said spacer's stop tab.

* * * * *